United States Patent [19]
Jenstrom et al.

[11] Patent Number: 5,363,051
[45] Date of Patent: * Nov. 8, 1994

[54] STEERING CAPACIFLECTOR SENSOR

[75] Inventors: Del T. Jenstrom, Crofton, Md.; Robert L. McConnell, Independence, W. Va.

[73] Assignee: The United States of America as represented by the Administrator of the National Aeronautics and Space Administration, Washington, D.C.

[*] Notice: The portion of the term of this patent subsequent to Nov. 24, 2009 has been disclaimed.

[21] Appl. No.: 979,987

[22] Filed: Nov. 23, 1992

[51] Int. Cl.$^5$ ............... G01R 27/26; G08C 19/10; H01H 47/12
[52] U.S. Cl. ................. 324/661; 324/688; 361/181; 340/870.37
[58] Field of Search ............ 324/660, 661, 687, 688, 324/690; 340/652, 653, 870.37; 307/116, 179, 180, 181

[56] References Cited

U.S. PATENT DOCUMENTS

| | | | |
|---|---|---|---|
| 3,593,115 | 7/1971 | Dym et al. | 323/93 |
| 3,626,287 | 12/1971 | DiNiro | 324/688 |
| 3,947,734 | 3/1976 | Fyler | 361/181 |
| 4,122,708 | 10/1978 | Maier | 73/136 A |
| 4,311,959 | 1/1982 | Riessland et al. | 324/61 P |
| 4,757,252 | 7/1988 | Maltby et al. | 324/687 |
| 4,767,940 | 8/1988 | Tuttle | 307/116 |
| 4,935,700 | 6/1990 | Garbini et al. | 324/687 |
| 4,950,084 | 8/1990 | Bailleul et al. | 361/181 |
| 5,081,406 | 1/1992 | Hughes et al. | 340/562 |
| 5,130,672 | 7/1992 | Watkiss et al. | 340/562 |
| 5,166,679 | 11/1992 | Vranish et al. | 340/870.37 |

Primary Examiner—Maureen K. Regan
Attorney, Agent, or Firm—Paul S. Clohan, Jr.; R. Dennis Marchant; Guy M. Miller

[57] ABSTRACT

A capacitive type proximity sensor having substantial range and sensitivity between a machine and an intruding object in the immediate vicinity of the machine and having a steerable sensing field has an outer electrical conductor on the machine forming one electrode of a sensor capacitor, the other electrode is the object. The outer conductor is a thin sheet of conductive material with a pair (or more) of intermediate electrical conductors located between the outer conductor and the machine. The pair of intermediate electrical conductors are in close proximity to each other and together form a surface having a size substantially larger than the outer conductor to act as a shield for reducing the parasitic capacitance between the outer conductor and the machine and to steer the sensor field. The pair of intermediate conductors are thin sheets of conductive material substantially wider than the first conductor. The outer and pair of intermediate conductors are attached to a surface on the machine in electrical isolation and with no gaps between the conductors and no gap between the surface and the pair of intermediate conductors. The outer and pair of intermediate conductors are also in conformance with each other and the surface of the machine, and the surface of the machine acts as a ground plane. Variable gain voltage follower circuits are used for coupling, in phase, the instantaneous voltage at the outer electrical conductor to the pair of intermediate electrical conductors and a signal generator is coupled to the outer conductor and is responsive to the capacitance of the sensor capacitor for generating a control signal to the machine.

10 Claims, 4 Drawing Sheets

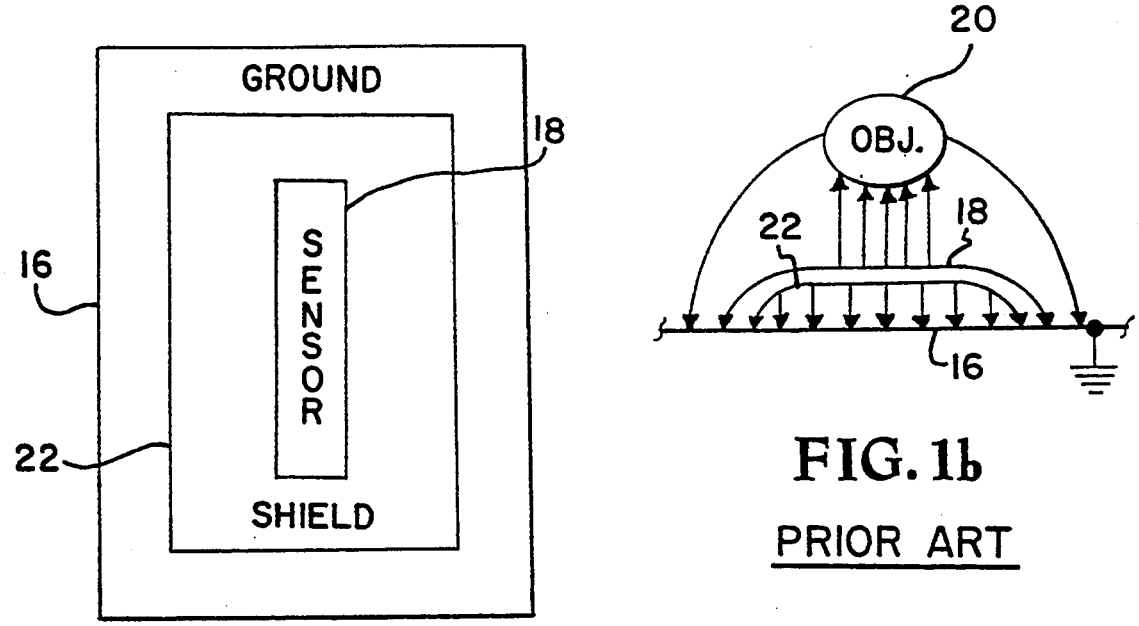
FIG. 1a
PRIOR ART
FIG. 1b
PRIOR ART
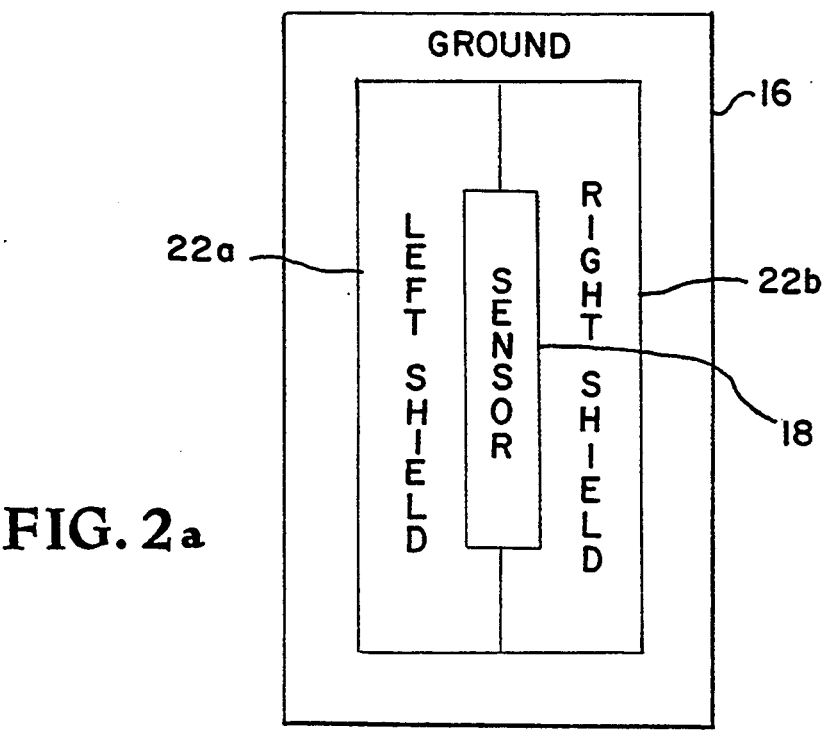
FIG. 2a

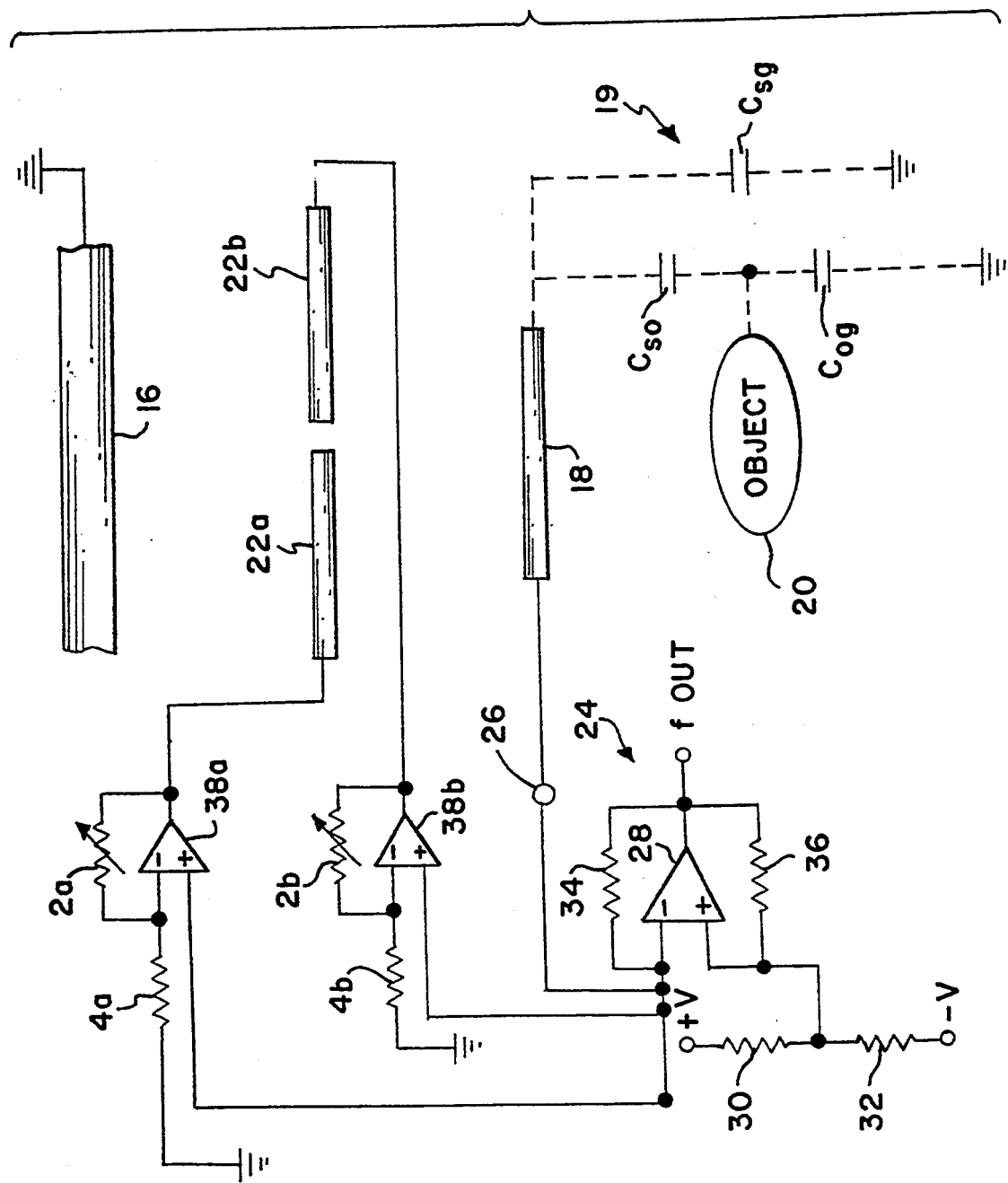

STEERING CAPACIFLECTOR SENSOR

ORIGIN OF THE INVENTION

The invention described herein was made by employees of the United States Government, and may be manufactured and used by or for the Government for governmental purposes without the payment of any royalties thereon or therefor.

TECHNICAL FIELD

This invention relates generally to proximity sensor apparatus and more particularly to a safety sensor in which a machine such as a robot senses the proximity to objects including humans at a range sufficient to prevent collisions.

CROSS REFERENCE TO RELATED APPLICATIONS

This invention is related to an invention shown and described in U.S. patent application Ser. No. 07/710,845, now U.S. Pat. No. 5,166,679, entitled "Driven Shielding Capacitive Proximity Sensor", filed in the name of John M. Vranish and Robert L. McConnell on Jun. 6, 1992. The above is assigned to the assignee of the present invention. Moreover, the teachings of this related application is herein meant to be incorporated by reference.

BACKGROUND ART

Prior methods for obtaining directional range information include laser range sensors, cameras, ultrasound, optical proximity sensors, and multiple independent capacitance proximity sensors. Laser sensors require complicated, expensive, and often large scanning mechanisms to steer the laser beam, and their performance can be adversely affected by object surface characteristics. Cameras also tend to be comparatively large, complicated, and expensive, and the task of processing the image is computationally intensive, even when dedicated targets are placed on the objects in the image. Ultrasound sensors are less precise and less physically distributed than capacitance proximity sensors, and either multiple sensors or some form of steering mechanism must be used. Ultrasound does not work in outer space. Optical proximity sensors are also less physically distributed necessitating many independent sensors or a complicated steering mechanism to be used. Sensing range is generally significantly less than capacitance proximity sensors, and ambient lighting conditions can interfere with their operation.

Multiple independent capacitance proximity sensors require more support electronics and hardware, they require more space, they may operationally interfere with each other, and they do not have the capability to change the amount that each sensing field overlaps with the others.

The present invention provides a means of obtaining directional proximity sensing while maintaining the inherent attributes of the basic Driven Shielding Capacitive Proximity Sensor. The present invention sensor is light weight, robust, simple, and inexpensive, and a minimum amount of electronics is needed to steer the sensing field. In addition, unlike video image processing, interpretation of the sensor output is extremely simple.

STATEMENT OF THE INVENTION

It is therefore an object of the present invention to provide an improvement to the prior art Driven Shielding Capacitive Proximity Sensor.

Another object of the invention is to provide an improved capacitive sensor for proximity sensing insofar as it relates to a robot's ability to prevent collisions with objects coming into relatively close proximity thereto.

These and other objects are achieved by providing an invention that separates the reflective shield of the Driven Shielding Capacitive Proximity Sensor into two separate halves, and drives each half with independent voltage amplifiers. The independent amplifiers are the mechanism by which the sensing field is directed, or steered. The ability to steer the sensing field allows a user to determine the presence of, and/or range to, an object in different directions from the sensor. This information can then be used to update robot path planning for obstacle avoidance, or extract object shape information for imaging purposes.

BRIEF DESCRIPTION OF THE DRAWINGS

FIG. 1a is a top view of the prior art Driven Shielding Capacitive Proximity Sensor.

FIG. 1b is a diagram illustrating the electric field distribution of the prior art Driven Shielding Capacitive Proximity Sensor.

FIG. 2a is a top view of the Steering Capiciflector Sensor according to the present invention.

FIG. 3 is an electrical schematic diagram illustrative of the preferred embodiment of the invention.

DETAILED DESCRIPTION OF THE INVENTION

This invention extends the capability of the basic Driven Shielding Capacitive Proximity Sensor or "Capaciflector" sensor shown in FIGS. 1a and 1b by providing a mechanism to steer the capacitive sensing field. The basic Capaciflector, first developed by J. Vranish and R. McConnell (referred to above in cross reference to related applications), senses the presence of object 20 within its field by the resulting shift in frequency of an oscillator circuit. The key element in the prior art Capaciflector design is reflective shield 22 which shields sensor 18 from nearby ground 16 and which forces sensor 18 field lines away from sensor 18, providing sensor 18 with a significant sensing range improvement over other forms of capacitive sensors.

Figure 2B:
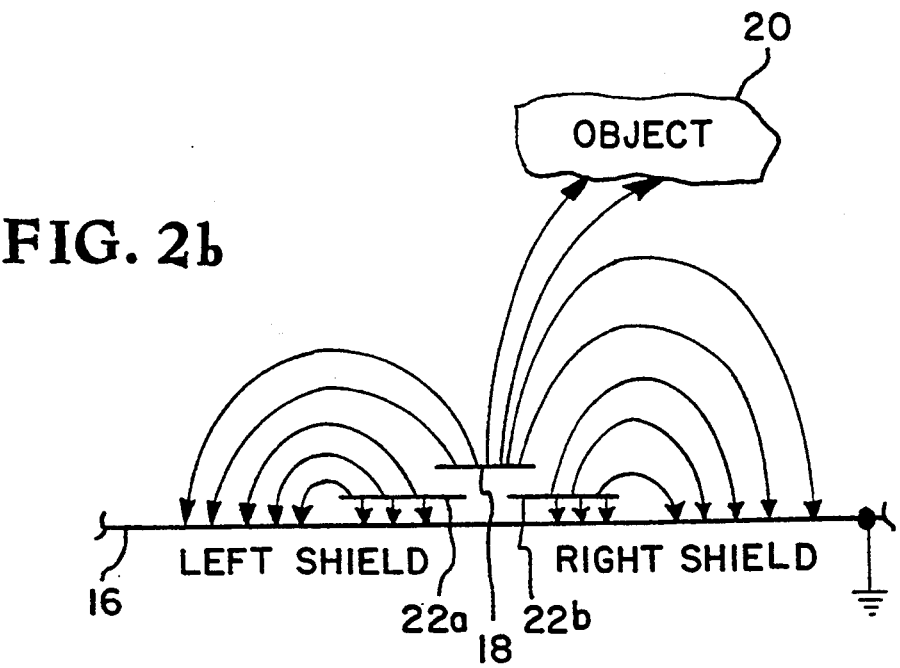
FIG. 2b is a diagram illustrating the electric field distribution of the Steering Capiciflector Sensor with the field steered to the right.

FIG. 2a shows a top view and FIG. 2b shows an edge view of the present invention, a Steering Capaciflector Sensor while FIG. 3 shows the associated circuitry of the invention. In this embodiment of the invention, shield 22 is divided up into two shields, left shield 22a and right shield 22b. As in the prior art Capaciflector, left shield 22a and right shield 22b are driven in phase with capacitive sensor 18, but they are not frequency sensitive to nearby objects as is sensor 18. Thus sensor 18 is shielded from nearby ground 16 (e.g., a robot arm) such that the capacitance between sensor 18 and ground 16 is substantially reduced if not eliminated. A relatively low frequency oscillator circuit 24 operating at, for example, 20 Khz is coupled to a circuit node 26 to which the capacitive type proximity sensor 18 is connected for the configuration shown in FIG. 2B. The total capacitance 19 between sensor 18 and intruding object 20 is comprised of capacitance $C_{sg}$ of sensor 18 to ground 16, the series combination of the capacitance $C_{so}$ from sensor 18 to object 20 and the capacitance $C_{og}$ of object 20 to ground 16. The composite of these three capacitances comprise a tuning capacitance for oscillator 24 which is configured from comparator 28, sensor 18, a voltage divider comprised of two fixed resistors 30 and 32, and the series resistors 34 and 36 which act as feedback resistors between the output of comparator 28 and negative (−) and positive (+) inputs, respectively. Voltage follower circuits comprised of operational amplifiers (op amps) 38a and 38b couple the instantaneous voltage at circuit node 26 to left and right shields 22a and 22b respectively. Resistors $2_a$ and $2_b$ are variable resistors used to control shield 22a and 22b voltages respectively. Resistors $4_a$ and $4_b$ are gain resistors that, in conjunction with resistors $2_a$ and $2_b$, determine amplifier 38a and 38b gain respectively.

Because object 20 is grounded, total capacitance 19 is:

$$C_{19} = C_{sg} + C_{so}$$

Since detection of small changes in $C_{19}$ are desired, the capacitance from the sensor to ground $C_{sg}$ must be relatively small and shields 22a and 22b operate to force the field lines from the sensor 18 towards object 20 as much as possible as shown in FIG. 2b. The result is the same when object 20 is not grounded as explained in the Driven Shielding Capacitive Proximity patent.

The method of operation of the Steering Capaciflector Sensor is identical to the Driven Shielding Capacitive Proximity Sensor except that left shield 22a and right shield 22b voltages steer the sensing field. For example, increasing right shield 22b voltage above that of left shield 22a steers the sensing field to the right.

Figure 5:
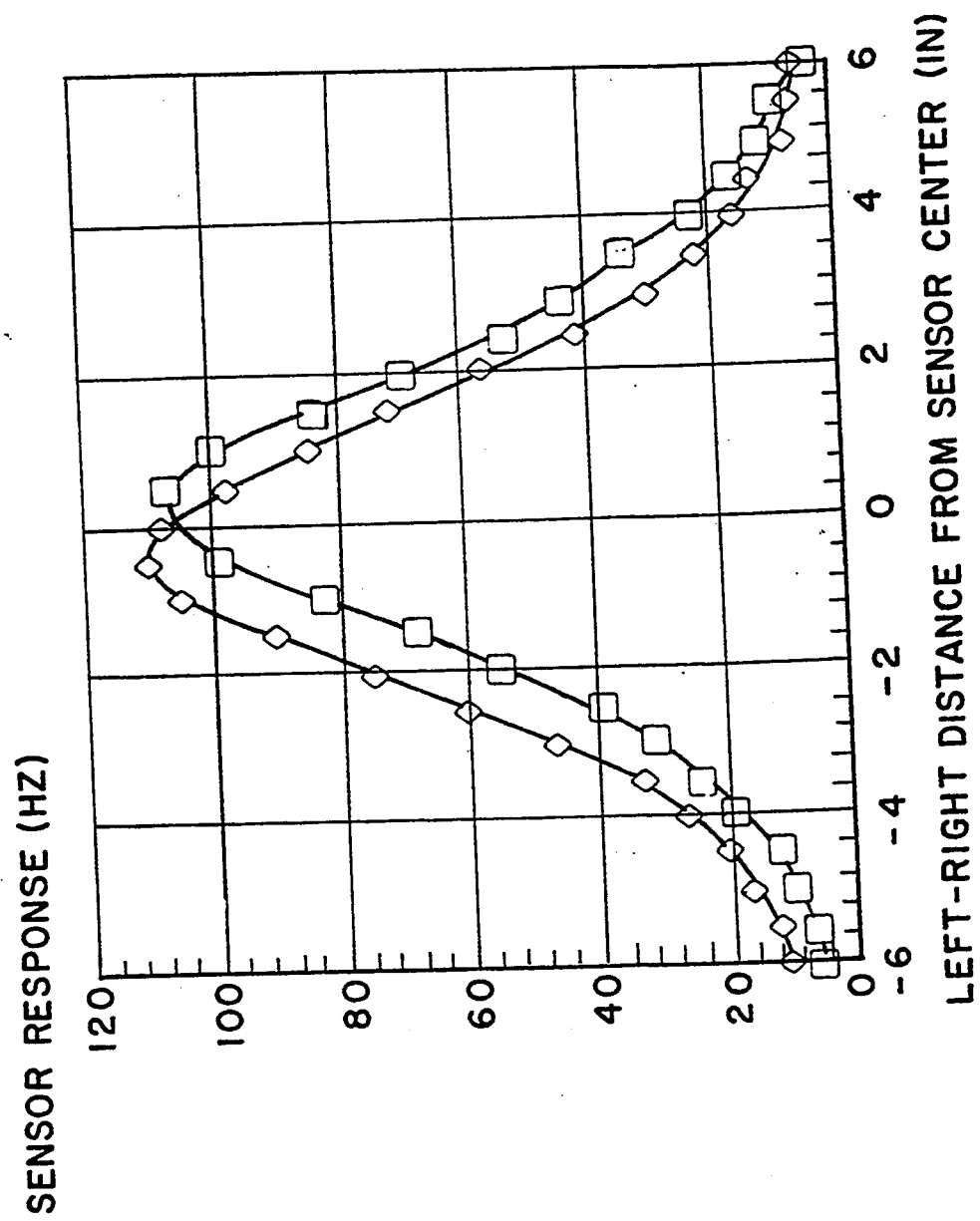
FIG. 5 is a graph of data showing the response of a typical Steering Capaciflector Sensor.

FIG. 5 shows actual test results measured with a prototype Steering Capaciflector Sensor. It confirms that significant steering of the sensing field occurs.

ALTERNATE EMBODIMENTS OF THE INVENTION

Figure 4:
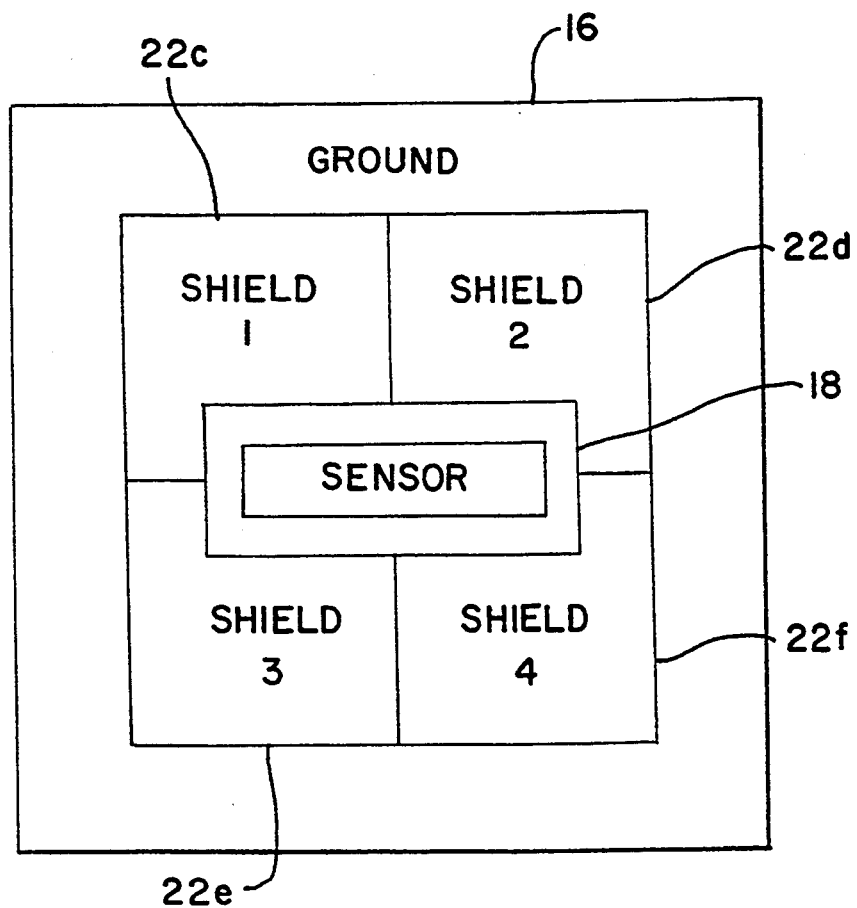
FIG. 4 is a top view of an alternative embodiment of the present invention.

The one-axis Steering Capaciflector Sensor described above can be extended into a two-axis steering sensor by using four independent shields 22c, 22d, 22e, 22f as shown in FIG. 4. By appropriately controlling the voltages of the four shields, this arrangement makes possible steering in both the X and the Y directions. Of course, the size, shape, and relative spacing of the four shields can be customized to meet individual sensing needs.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A capacitive type proximity sensor having substantial range and sensitivity between a machine and an intruding object in the immediate vicinity of the machine and a steerable sensing field, comprising:

an outer electrical conductor on said machine forming one electrode of a sensor capacitor, the other electrode comprising said object, said outer conductor comprising a first thin sheet of conductive material;

a plurality of intermediate electrical conductors located between said outer conductor and said machine, said plurality of intermediate electrical conductors in close proximity to each other, said plurality of intermediate electrical conductors together comprising a surface having a size substantially larger than said outer conductor acting as a shield for reducing the parasitic capacitance between said outer conductor and said machine, said plurality of intermediate conductors comprising a plurality of thin sheets of conductive material together substantially wider than said first conductor;

said outer and plurality of intermediate conductors attached to a surface on said machine with no gap between said conductors and no gap between said surface and said plurality of intermediate conductors, the surfaces of said outer and plurality of intermediate conductors conjoining with each other and said surface of said machine, said conductors being electrically isolated from one another and said surface of said machine acting as a ground plane;

first circuit means for coupling, in phase and with variable gain, the instantaneous voltage at said outer electrical conductor to said plurality of intermediate electrical conductors;

second circuit means coupled to said outer conductor and being responsive to the capacitance of said sensor capacitor for generating a control signal to said machine.

2. The sensor of claim 1 wherein said plurality of intermediate electrical conductors comprises a pair of intermediate electrical conductors.

3. The sensor of claim 1 wherein said plurality of intermediate electrical conductors comprises four intermediate electrical conductors.

4. The sensor of claim 1 wherein said first circuit means comprises voltage follower circuits comprised of operational amplifiers.

5. The sensor of claim 4 wherein said second circuit means comprises a signal generator having an output signal indicative of the capacitance of said sensor capacitor.

6. The sensor of claim 5 wherein said signal generator comprises a variable frequency oscillator.

7. The sensor of claim 1 wherein said machine comprises a robotic apparatus.

8. The sensor of claim 7 wherein said robotic apparatus comprises a movable member of said robotic apparatus.

9. The sensor of claim 8 wherein said movable member comprises an articulated member.

10. The sensor of claim 9 wherein said articulated member comprises a robotic arm.

* * * * *